H. F. & H. G. WEINLAND & G. H. AINGE.
LUBRICATING DEVICE.
APPLICATION FILED MAR. 12, 1908.
978,087.
Patented Dec. 6, 1910.
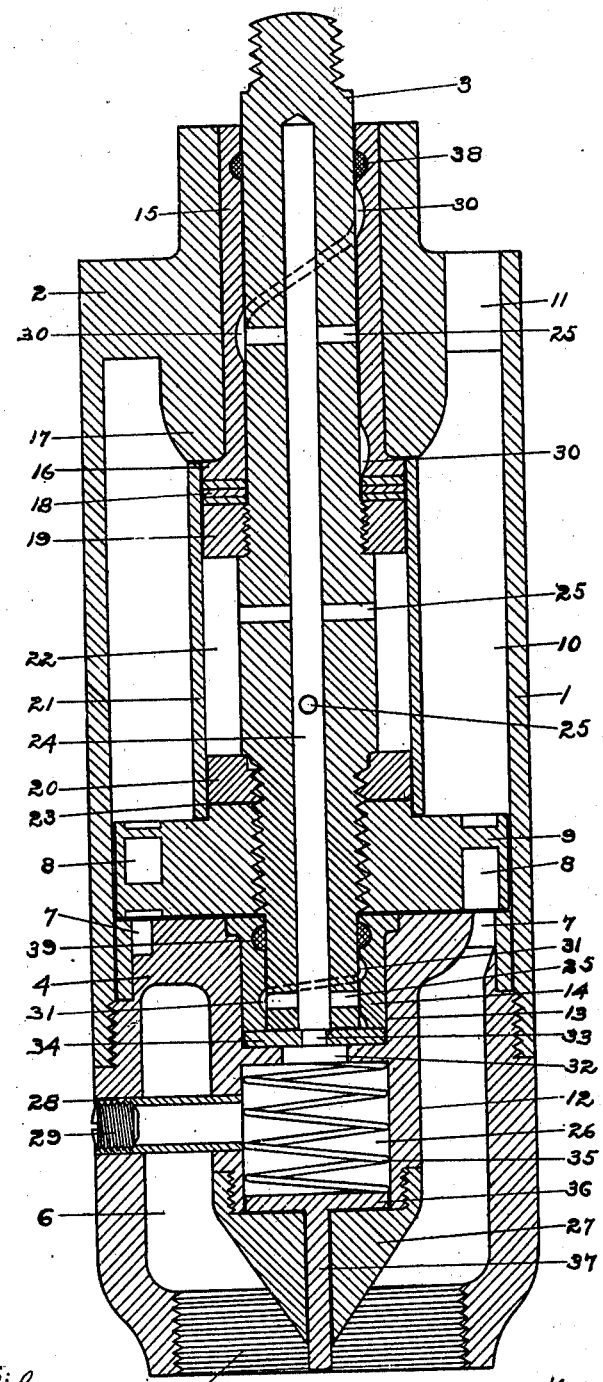

UNITED STATES PATENT OFFICE.

HENRY F. WEINLAND, HERMON G. WEINLAND, AND GEORGE H. AINGE, OF SPRINGFIELD, OHIO, ASSIGNORS TO THE LAGONDA MANUFACTURING COMPANY, OF SPRINGFIELD, OHIO, A CORPORATION OF OHIO.

LUBRICATING DEVICE.

978,087.   Specification of Letters Patent.   Patented Dec. 6, 1910.

Application filed March 12, 1908. Serial No. 420,577.

*To all whom it may concern:*

Be it known that we, HENRY F. WEINLAND, HERMON G. WEINLAND, and GEORGE H. AINGE, citizens of the United States, residing at Springfield, in the county of Clark and State of Ohio, have invented certain new and useful Improvements in Lubricating Devices, of which the following is a specification, reference being had thereto in the accompanying drawings.

Our invention relates to lubricating devices for rotary motors and more particularly for rotary motors designed and used for driving boiler tube cleaners that are carried through the tube with the cleaner.

The object of our invention is to provide a new and improved means for lubricating the bearings of the motor, and with this end in view, we provide a lubricant reservoir carried by the driving shaft with conduits to the bearings, together with an auxiliary channel in the bearings to more evenly distribute the lubricant throughout the bearings. We further provide a pressure device to force the lubricant into the conduits and reservoir, and employ means to prevent the escape of the lubricant from the bearings.

With these and other objects in view, our invention consists of the constructions and combinations hereinafter described and set forth in the claims.

In the accompanying drawing, we have shown a motor, embodying our invention, actuated by water pressure, but it will readily be seen our improved means for lubricating the bearings can be applied to similar motors operated by air, steam, or other actuating medium, and we do not limit our claims to a water-driven motor.

In the figure shown, 1 represents the casing of a motor having an exhaust-head 2, which carries the front bearing for the driving-shaft 3. A feed-head 4 is screw-threaded into the rear end of the casing, as shown, and is provided with a screw-threaded inlet 5, to which the supply hose can be attached. The actuating medium passes through the inlet 5, the chamber 6, and ports 7, to the buckets 8, of the turbine runner 9, and exhausts through a chamber 10 and exhaust ports 11, in a well known manner. The feed-head 4 has a central rearward extension 12, in which we form a recess 13, to carry the rear end of the driving-shaft 3, and we preferably provide a removable bushing 14 in said recess to form this bearing; and we likewise preferably provide a removable bushing 15 in the exhaust-head 2 to form the front bearing for the driving-shaft. Said bushing has a shoulder 16, that engages a rearward extension 17 of the exhaust-head, and a plurality of disks 18, loosely mounted on the driving-shaft, are interposed between said bushing and a collar 19, screw-threaded on the shaft, forming a thrust bearing. The runner 9 is screw-threaded on the shaft 3, and a thrust collar 20 is likewise screw-threaded on the shaft, as shown. The collars 19 and 20 form the side walls, and a band or cylinder 21, shrunk or otherwise secured on the collars, forms an annular lubricant reservoir 22 around the shaft. The cylinder 21 extends from the face of the runner to the rearward extension 17 of the exhaust-head, covering the disks 18 and the joint 23 between the runner and the collar 20. We have shown the driving-shaft 3 with a longitudinally-extending conduit 24 therein, opening at the rear end and having transverse openings 25 to the lubricant chamber 22 and to the front and rear bearings. In the rearward extension 12, of the feed-head 4, we also form a lubricant reservoir 26, having a cap 27, screw-threaded into place to close the outer end as shown; and a pipe 28, pressed in place through perforations in the outer casing and the rearward extension 12 of the feed-head, and extending through the chamber 6, forms a conduit through which the lubricant is introduced, a screw-plug 29 being provided to retain the lubricant. In addition to the channels leading to the bearings, we further provide a spiral groove or channel 30 in the bushing 15 of the front bearing, to more evenly distribute the lubricant throughout the length of the bearing, and we also provide a like groove 31 in the bushing 14 of the rear bearing.

The lubricant, being introduced through the conduit 28 to the chamber 26, passes through an opening 32 in the rear extension 12 of the feed-head, and also through a perforation 33 of a hardened thrust-plate 34, to the longitudinal conduit 24 in the shaft, and thence passes through the transverse openings 25 to the reservoir 22, and to the front and rear bearings, the spiral grooves 30 and 31 evenly distributing it throughout the length of the bearings.

To insure a constant supply of the lubricant in the reservoir and bearings, we provide a spring 35, in the chamber 26, which presses against the piston 36, having a spindle 37 which extends through an opening in the cap 27, and at its outer end receives the pressure of the actuating medium. While the motor is at rest and the spring 35 is holding the piston 36 in its initial position shown in the drawing, the chamber 26 is filled with lubricant, and when the motor is started, the pressure of the actuating medium will overcome the spring 35, and the piston 36 will force the lubricant through the conduits to the reservoir 22 and to the bearings. To prevent loss of the lubricant we provide a seal for each of the bearings, which we have shown in the form of annular chambers, 38 and 39, in the bushings, to hold a felt or fibrous packing of any suitable material.

It will be seen that after the pressure device has filled the lubricant reservoir 22 and the motor is at rest, the lubricant will flow from the reservoir to the bearings.

We have shown the front end of the driving-shaft screw-threaded to attach the cleaner or machine to be driven.

Having thus described our invention, we claim:

1. The combination of a rotatable member and a stationary member having a bearing therefor, said stationary member further having formed therein a chamber for a pressure medium with a suitable inlet and also a lubricant reservoir with a conduit to said bearing, means in said reservoir subject to the pressure in said chamber to force the lubricant to said bearing, a device to return said means to its initial position when not under pressure, and means to introduce a lubricant to said reservoir, substantially as described.

2. The combination of a rotatable member and a stationary member having a recess forming a bearing for said rotatable member, said stationary member further having formed therein a chamber for a pressure medium with a suitable inlet and also a hollow portion extending into said chamber having an opening to said bearing, a cap to close the outer end of said hollow portion to form a lubricant reservoir, a piston in said reservoir having a spindle extending through said cap subject to the pressure in said chamber, a spring adapted to return said piston to its initial position when not under pressure and a conduit to introduce a lubricant to said reservoir, substantially as described.

3. The combination of a rotatable member and a casing having bearings therefor, said rotatable member having a lubricant chamber formed thereon with conduits to said bearings, said casing having a head with one of said bearings formed therein, said head further having a chamber for a pressure medium with a suitable inlet and a lubricant reservoir with an opening to one of said conduits, means in said reservoir subject to the pressure in said pressure chamber to force the lubricant to the lubricant chamber on the rotatable member and to said bearings, a device to return said means to its initial position when not under pressure, and means to introduce a lubricant to the reservoir in said head, substantially as described.

4. The combination of a rotatable member and a casing having a head with a removable bushing forming a bearing for said rotatable member, said bushing having a shoulder to engage the inner side of said head, collars on said rotatable member, a band or cylinder shrunk on said collars to form a lubricant reservoir having a conduit to said bearing, disks interposed between said bushing and one of said collars, the band or cylinder extending over said disks and bushing shoulder and abutting on said head and means to introduce a lubricant to said reservoir, substantially as described.

5. The combination of a rotatable member and a casing having oppositely disposed heads with bearings for said rotatable member, said rotatable member having a closed lubricant chamber formed thereon with conduits to said bearings, one of said heads further having a chamber with suitable inlet for a pressure medium and a lubricant reservoir with an opening to one of said conduits, a piston in the lubricant reservoir of the head subject to the pressure in the pressure chamber, a groove to evenly distribute the lubricant to the bearings and a packing to prevent the escape of the lubricant from the bearings, substantially as described.

In testimony whereof, we hereunto affix our signatures in the presence of two witnesses.

HENRY F. WEINLAND.
HERMON G. WEINLAND.
GEORGE H. AINGE.

Witnesses:
GROVER F. ILGEN,
CARL CASKEY.